United States Patent
Yang et al.

(10) Patent No.: US 12,307,530 B2
(45) Date of Patent: May 20, 2025

(54) ASSIGNING NON-FUNGIBLE TOKEN (NFT) TO CREATIVE IN-GAME CONCEPT ASSET DESIGNS

(71) Applicant: Sony Interactive Entertainment Inc., Tokyo (JP)

(72) Inventors: Yiwei Yang, San Mateo, CA (US); Matt Tomczek, San Mateo, CA (US); Andrew Ahn, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 299 days.

(21) Appl. No.: 17/746,374

(22) Filed: May 17, 2022

(65) Prior Publication Data
US 2023/0377056 A1 Nov. 23, 2023

(51) Int. Cl.
*G06Q 20/12* (2012.01)
*A63F 13/69* (2014.01)
*G06Q 20/38* (2012.01)
*G06Q 30/08* (2012.01)
*G06Q 50/00* (2012.01)

(52) U.S. Cl.
CPC ........... *G06Q 50/01* (2013.01); *A63F 13/69* (2014.09); *G06Q 20/389* (2013.01); *G06Q 30/08* (2013.01); *A63F 2300/575* (2013.01); *A63F 2300/609* (2013.01)

(58) Field of Classification Search
None
See application file for complete search history.

(56) References Cited

U.S. PATENT DOCUMENTS

| | | | |
|---|---|---|---|
| 10,269,009 B1* | 4/2019 | Winklevoss | G06Q 20/105 |
| 10,505,726 B1* | 12/2019 | Andon | G06F 16/284 |
| 10,850,202 B1* | 12/2020 | Koch | G06Q 20/381 |
| 10,936,580 B2* | 3/2021 | Shi | G06Q 30/018 |
| 11,062,284 B1* | 7/2021 | Cunningham | A63F 13/71 |
| 11,288,645 B1* | 3/2022 | Kao | G06Q 20/123 |
| 2017/0103391 A1* | 4/2017 | Wilson, Jr. | G06Q 20/4016 |
| 2019/0130701 A1* | 5/2019 | Simons | G07F 17/3288 |
| 2019/0303892 A1* | 10/2019 | Yantis | G06Q 20/3825 |
| 2020/0184041 A1* | 6/2020 | Andon | H04L 9/0891 |

FOREIGN PATENT DOCUMENTS

| | | |
|---|---|---|
| CN | 110910135 A | 3/2020 |
| KR | 1021627625 B1 | 10/2020 |

OTHER PUBLICATIONS

Intl Search Report and Written Opinion, PCT/US2023/066144, dated Aug. 23, 2023, 15 pages.
Anonymous: "Steam (service)—Wikipedia", May 13, 2022 (May 13, 2022), pp. 1-69, XP93072680, Retrieved from the Internet: URL:https://en.wikipedia.org/w/index.php?title=Stem_(service)&oldid=1087678214 [retrieved on Aug. 10, 2023] pp. 1, 3, 5 pp. 11,12, 20.

* cited by examiner

*Primary Examiner* — Sunit Pandya
(74) *Attorney, Agent, or Firm* — Kilpatrick Townsend & Stockton LLP

(57) ABSTRACT

Methods and systems are provided for receiving a virtual asset designed by a user, rendering the virtual asset in a virtual marketplace and allow other users to provide feedback. The feedbacks from the other users are evaluated to compute a value for the virtual asset. Based on the value, access to the virtual asset is provided to allow incorporation of the virtual asset into a video game for use during play. A NFT is generated for the virtual asset to allow tracking use of the virtual asset in the video game.

12 Claims, 5 Drawing Sheets

| Virtual Asset | Selection option | Type | Characteristics | User feedback | action |
|---|---|---|---|---|---|
| [img] | ☐ | Game asset | Moving asset, wings to fly long distance, mace with bow/arrow, can be handled manually or deployed, | Comments: 5,398<br>Likes: 4802<br>Dislikes: 96 | ☑ Buy<br>☐ Sell<br>☐ Trade<br>☐ Collect |
| [img] | ☐ | Game asset | Wearable, moving asset, wings to allow game character to fly, wheels to allow game character to skating, has | Comments: 33K<br>Likes: 20k<br>Dislikes: 5k | ☑ Buy<br>☐ Sell<br>☐ Trade<br>☐ Collect |
| [img] | ☐ | Game character | Capable of flying through space, fast, skilled to use multiple weapons at once, can operate in invisible mode | Comments: 55k<br>Likes: 35K<br>Dislikes: 50 | ☐ Buy<br>☐ Sell<br>☑ Trade<br>☐ Collect |
| [img] | ☐ | Game character | Capable of flying at low levels and slide on ground, use fire to destroy, capable of wielding weapons and very difficult to destroy/defeat | Comments: 16.7k<br>Likes: 27k<br>Dislikes: 320 | ☑ Buy<br>☐ Sell<br>☐ Trade<br>☐ Collect |
| [img] | ☐ | Game character | Capable of operating at all levels, precision attacks, comes with 1-3 weapons, can disguise to represent different character (replicate existing game character or to a new game character) | Comments: 33k<br>Likes: 520k<br>Dislikes: 98k | ☐ Buy<br>☐ Sell<br>☐ Trade<br>☑ Collect |
| ----- | ----- | ----- | ----- | ----- | ----- |

Figure 3

ASSIGNING NON-FUNGIBLE TOKEN (NFT) TO CREATIVE IN-GAME CONCEPT ASSET DESIGNS

TECHNICAL FIELD

The present disclosure relates to providing virtual assets in a video game and more particularly to providing virtual assets designed by one or more users for use in the video game.

BACKGROUND OF THE DISCLOSURE

With the growing popularity of the video games, developers are constantly trying to find ways to keep the users engaged in the video games. To improve user engagement, developers try and design new games, re-design existing games by incorporating new features and special effects, and try to introduce newer game characters. The newer game characters or game assets are designed to include special skills, unique looks, special or multiple capabilities, and other characteristics, to capture the attention and interest of users. As the demand for the video games increases, so has the demand for new designs or newer concepts of game assets/game characters.

It is in this context that embodiments of the disclosure arise.

SUMMARY

Implementations of the present disclosure relate to systems and methods for providing virtual assets for inclusion in a video game. Designing the virtual assets does not rest solely on the developers of the video games but is opened to other users including users of the video games and non-users of the video game. The user-designed virtual assets are presented in a virtual gallery in a virtual marketplace for the developers of different video games to view, market and provide feedback. A user interface is provided alongside the virtual gallery for the developers to provide feedback. In addition to the developers having the capability to interact, the virtual marketplace is also open to other users to provide their feedback, such as comments, likes, dislikes, ratings, etc. The feedback for the different virtual asset from the different users can be used to determine the marketplace dynamics of the virtual assets displayed in the virtual gallery. The developers can use the marketplace dynamics to identify a virtual asset that has the best or the most popular or the most innovative design and incorporate the identified virtual asset in a video game that they are developing or in an existing video game that they already developed.

A non-fungible token (NFT) is minted for each virtual asset designed by a user. The NFT minted virtual assets are stored in a blockchain and used to keep track of the use of the respective virtual asset by other users, including the developers. The virtual asset can be a game character that can be used to represent a player in a video game when incorporated within or can be a game asset that can be included in one or more game scenes of the video game. The virtual asset is designed to include a plurality of characteristics to define the virtual asset. The plurality of characteristics can include rendering characteristics used to define how the virtual asset is to be rendered in the video game, and interaction characteristics to define how the virtual asset is to behave in response to interactions during play of the video game. The plurality of characteristics and other details of the virtual asset are maintained as metadata in the NFT minted for the virtual asset.

The blockchain for storing the NFT of the virtual asset can be a proprietary blockchain available to users/non-users of select video games or can be a public blockchain available to broad range of video games. The proprietary blockchain can be hosted and made available within a local area network accessible to the users/non-users (e.g., members). The local area network can be a cloud-based network with the video games being executed on a cloud server and accessed by the members of the network. Allowing the users and non-users (i.e., non-developers) of the video game to design the virtual assets eases the content-creating burden on the developers. Further, minting the NFTs for the virtual assets designed by the users, other than developers, allows the users to market their designs and be compensated for the design, further incentivizing the users and encouraging them to invent additional virtual assets. Opening the design aspect of the virtual assets to users enables the developers to focus on developing the video game and leave the design aspect of the virtual assets used in the video game to the users. The users are provided with the freedom to innovate virtual assets that the users like to see in the video game in addition to the virtual assets designed by the developers.

In one implementation, a method for including a virtual asset within a video game is disclosed. The method includes receiving the virtual asset designed by a specific user for use in the video game. The virtual asset is designed to include a plurality of characteristics. The virtual asset is presented in a virtual marketplace accessible to users of the video game and feedback is received from the users of the video game. The feedback is evaluated to compute a value indicative of a level of acceptance of the virtual asset amongst the users. Based on the value of the virtual asset, access to the virtual asset is provided to allow incorporation of the virtual asset in the video game for use during play of the video game. A non-fungible token (NFT) is minted for the virtual asset. The NFT minted for the virtual asset is stored in a blockchain and used to track the use of the virtual asset in the video game.

In another implementation, a method is disclosed. The method includes receiving a virtual asset designed by a user for use in one or more video games. The virtual asset is designed to include a plurality of characteristics. A non-fungible token (NFT) is generated for the virtual asset. The NFT of the virtual asset is stored in a blockchain and includes metadata providing details of the virtual asset. The virtual asset with the generated NFT is presented for sale in a virtual marketplace accessible to developers of the one or more video games. The virtual marketplace includes a virtual gallery for presenting a plurality of virtual assets designed by different users including the virtual asset designed by the user, and a user interface for trading the plurality of virtual assets presented in the virtual gallery. Bids are received from one or more developers of a video game for the virtual asset designed by the user. In response to accepting a bid, the virtual asset is transferred to the developer of the video game. The transferring of the virtual asset includes sharing a location link of the virtual asset with the developer and updating the NFT of the virtual asset in the blockchain with details of the transfer. The location link provides the developer with access to the virtual asset for inclusion in the video game.

In yet another implementation, a method is disclosed. The method includes providing a virtual marketplace accessible to players of a plurality of video games. The virtual marketplace is configured to exhibit and manage a plurality of virtual assets designed by a plurality of users, wherein each virtual asset is designed to include a distinct set of characteristics. Activities received from the plurality of players and directed toward each virtual asset at the virtual marketplace are evaluated to compute a value for the virtual asset. The value associated with each virtual asset indicates a level of demand for said virtual asset among the players of the plurality of video games. A selection of a particular virtual asset from the plurality of virtual assets exhibited in the virtual marketplace is received, based on the values computed for the plurality of virtual assets. In response to the selection, access is provided to the particular virtual asset to allow incorporation into a video game as a game asset. The incorporation is done such that the game asset exhibits the distinct set of characteristics during play of the video game. A non-fungible token is minted for the particular virtual asset to allow tracking use of the particular virtual asset in the video game. The NFT is minted to include metadata with details of the user who created the particular virtual asset and the distinct set of characteristics associated with the particular virtual asset.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 3 illustrates a simplified view of a virtual marketplace with a virtual gallery to exhibit the virtual assets designed by a plurality of users and a user interface for marketing the virtual assets, in accordance with one implementation of the present disclosure.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As video games become popular, developers are excited to create new video games with unique effects, unique features, unique challenges within game scenes, and game characters/assets with unique looks, unique features and capabilities to get the users excited and keep them engaged and interested. However, with the growing popularity of the video games, the developers are constantly burdened with developing newer video games. To alleviate the demand placed on the developers and to make the video games more personable to users, users are encouraged to create and submit their own designs of virtual assets for inclusion in video games. The various implementations discussed herein encourage the users to create and display their own designs for virtual assets in a virtual marketplace for other users to comment. The feedback from other users is evaluated to determine the marketplace dynamics (i.e., a level of acceptability) of the virtual asset designed by a user. Based on the feedback from other users, a developer of a video game can determine whether to include or not include the virtual asset designed by the user into a video game that they are developing or have already designed.

As noted above, encouraging the users (i.e., non-developers) of the video game to design virtual assets for inclusion in video games not only alleviates the burden on the developer but also makes the video game more personable to the users. The user participation in the design of the virtual assets encourages the users to be more engaged in the video game. The users are incentivized to design virtual assets by allowing the users to market their virtual asset designs in a virtual marketplace, thereby encouraging the user and other users to participate and become involved in the video game.

With the general understanding of the disclosure, specific details of the disclosure will now be described with reference to the various figures.

Figure 1A:
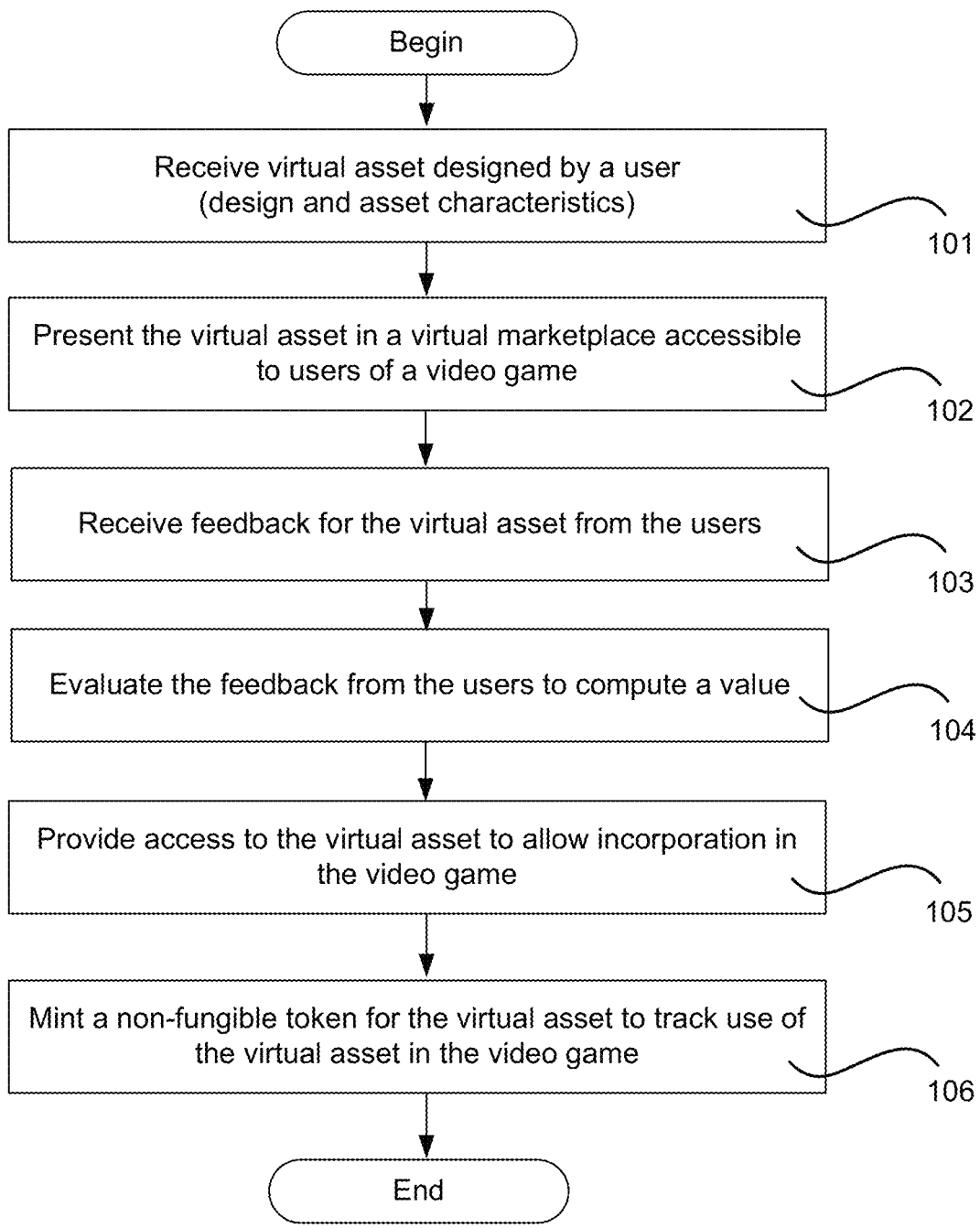
FIG. 1A illustrates a simplified flow of operations of a method for including a virtual asset within a video game, in accordance with one implementation of the present disclosure.

FIG. 1A illustrates a simplified flow of operations of a method for including a virtual asset designed by a user within a video game, in one implementation. A virtual asset is designed by a user and offered for implementation in one or more video games. The user designing the virtual asset, in some implementations, may be a player, a spectator, a content provider, or any other user who is not a developer of the video game. In alternate implementations, the user may be a developer who would like to test to see how receptive users of a video game are to a new design concept of a virtual asset designed by the developer before the developer implements it in a video game. The virtual asset designed by the user is received at a server that is accessible to one or more video games, as illustrated in operation 101. The server may be an independent game server or may be a cloud server that is part of cloud gaming system on which one or more video games are hosted. The user designs the virtual asset using any design tool that is available to them. As part of designing the virtual asset, the user defines asset characteristics to define how the virtual asset will look, behave, interact with other virtual assets and virtual game characters, and respond to an external stimulus such as inputs from users within a video game.

The virtual asset received from the user is verified to ensure that the user is an authorized user who is allowed to access the server to upload the virtual asset and the design meets, at a minimum, the design criteria established for user-developed content defined at the server. Upon successful authentication of the user, the virtual asset is uploaded to a virtual marketplace accessible to a plurality of users of a video game, as illustrated in operation 102. In some implementations, the virtual marketplace is provided alongside a game title of the video game or can be provided at the server and accessed by the plurality of users of the video game. In one implementation, the virtual marketplace includes a virtual gallery and a user interface. The virtual gallery is designed to exhibit the virtual asset designed by the user alongside other virtual assets designed by other users. The user interface is designed to allow the other users including players, spectators, game developers, video game sponsors, video game content providers, other virtual asset designers, etc., to view, provide feedback, buy, sell, and trade each virtual asset exhibited in the virtual gallery. The feedback from users can include comments, likes, dislikes, ratings, etc., for each virtual asset and the user interface provides options to provide such feedback.

The other users access the user interface for providing their feedback by accessing the virtual marketplace rendered alongside the game title of the video game or at the server. Feedback for the virtual asset is received from the other users at the user interface of the virtual marketplace, as illustrated in operation 103, and is forwarded to a virtual asset marketing engine (shown in FIG. 2) executing at the server for further processing. The virtual asset marketing engine evaluates the feedback from the other users to compute a value for the virtual asset displayed in the virtual gallery, as shown in operation 104. For example, the virtual asset marketing engine examines each feedback to determine various attributes associated with the feedback, such as a type, user identifier, user reputation, the context of the content included in the feedback, and computes a value for each virtual asset as a function of the various attributes. Each of the aforementioned attributes may be weighted and the value of the virtual asset is computed as a function of the weighted attributes. For instance, a feedback from a reputed user may carry a higher weight than a feedback from a lesser known user. Similarly, a "like" or a "love" comment can carry a higher weight than a textual comment. As a result, a virtual asset that garners greater number of positive comments and likes can have a higher value than a virtual asset that garners lesser number of comments or greater number of negative comments and dislikes.

Based on the value computed for each virtual asset, the virtual asset designed by the user is selected and access is provided to the virtual asset for incorporating into the video game, as illustrated in operation 105. The virtual asset may be incorporated as a game asset or a game character. The game asset may be incorporated into one or more game scenes. As part of incorporating, the game asset is blended into the one or more game scenes and defined to include interactive attributes that are in accordance to the asset characteristics defined for the virtual asset. For instance, the interactive attributes may define how the game asset has to react/behave in the game scene when a user inputs provided during game play are directed toward the game asset in the game scene.

In addition to incorporating the virtual asset in the video game, a non-fungible token (NFT) is also minted for the virtual asset, as illustrated in operation 106. The NFT may be minted for the game asset using a proprietary blockchain or a publicly available blockchain. The NFT is used to keep track of the virtual asset within the video game.

Figure 1B:
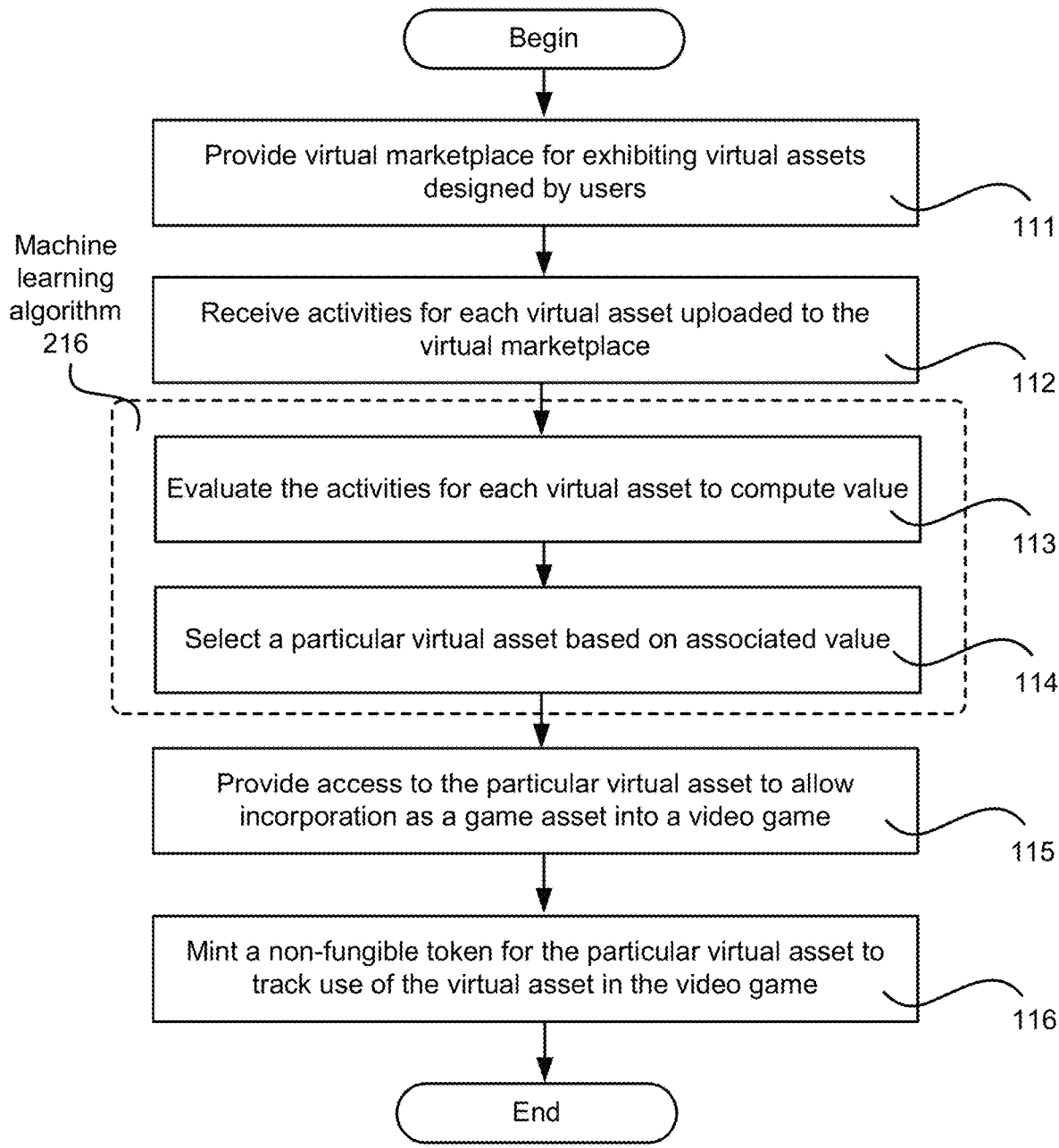
FIG. 1B illustrates a simplified flow of operations of a method for including a virtual asset within a video game, in accordance with an alternate implementation of the present disclosure.

FIG. 1B illustrates a simplified flow of operations of an alternate method for including a virtual asset designed by a user within a video game, in one implementation. In this implementation, the method begins at operation 111 wherein a virtual marketplace is provided to users to exhibit virtual assets designed by them. The virtual marketplace is designed to be rendered alongside game titles of a plurality of video games available at a server. The server, as noted above, may be an independent server or may be part of a network of server computing devices (i.e., part of a wide area network) or may be part of a cloud gaming system that hosts the plurality of video games. The virtual marketplace includes a virtual gallery for exhibiting the virtual assets designed by a plurality of users and a user interface to receive activities pertaining to each virtual asset from a plurality of users. As and when a user creates a virtual asset, the user can upload the virtual asset to the virtual gallery.

The activities pertaining to each virtual asset exhibited in the virtual gallery are received at the user interface provided in the virtual marketplace, as illustrated in operation 112. The activities can include feedback, such as comments, likes, dislikes, etc., as well as activities such as buys, sells, and trades of the virtual asset. The user interface is provided to facilitate performing such activities by providing options to comment, sell, buy, and trade the virtual asset. The activities provided at the user interface are evaluated to determine the marketplace dynamics of each virtual asset uploaded to the virtual marketplace. The marketplace dynamics can be used to determine which virtual assets the users value most, which virtual assets the users buy or trade the most, which virtual assets have the best design or are popular with the users, etc. The activities pertaining to each virtual asset are used to determine a value that is indicative of a level of acceptability and level of demand of the virtual asset amongst the plurality of users, as illustrated in operation 113.

In some implementations, a machine learning algorithm is employed to determine the value of each virtual asset. The machine learning algorithm uses the feedback for each virtual asset to train the AI model and use output from the AI model to compute a value for the respective virtual asset. A particular virtual asset is selected from the virtual assets exhibited in the virtual marketplace, based on the computed values, as illustrated in operation 114.

Responsive to selection of the virtual asset, based on value, access to the virtual asset is provided, as illustrated in operation 115. Access to the virtual asset allows the virtual asset to be incorporated (i.e., inserted) into one or more game scenes of a video game as a game asset. The virtual asset is incorporated in the game scenes in accordance to the defined characteristics of the virtual asset. The characteristics are defined to specify how the virtual asset appears and behaves to inputs from users within the game scenes.

As part of incorporating the virtual asset as game asset in the video game, a non-fungible token (NFT) is minted for the virtual asset, as illustrated in operation 116. The NFT for the virtual asset is minted to include metadata providing details of the virtual asset and is stored in a blockchain. The NFT can be minted and stored using a generally available blockchain or a proprietary blockchain. The NFT is used to track use of the virtual asset (i.e., game asset) in the video game.

Figure 1C:
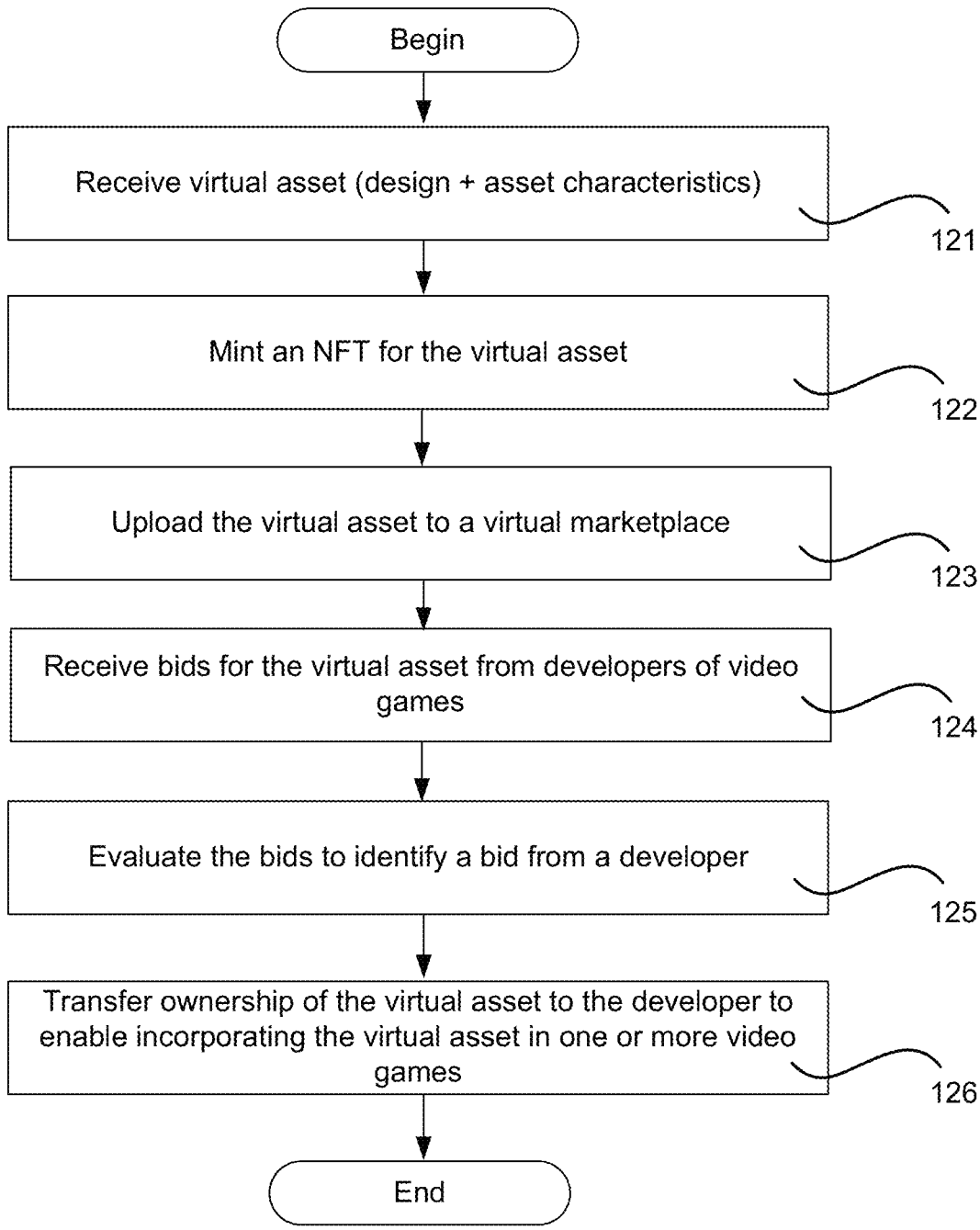
FIG. 1C illustrates a simplified flow of operations of a method for including a virtual asset within a video game, in accordance with yet another implementation of the present disclosure.

FIG. 1C illustrates a simplified flow of operations of an alternate method for including a virtual asset designed by a user within a video game, in one implementation. The method begins at operation 121, wherein a virtual asset is received from a user. The user designs the virtual asset and includes asset characteristics that are used to define how the virtual asset has to behave or interact when the virtual asset is included in a video game.

An NFT is minted for the newly created virtual asset, as illustrated in operation 122. The NFT for the virtual asset includes metadata providing details of the virtual asset, such as creator of (i.e., user who created) the virtual asset, virtual asset creation date, NFT creation date, current owner, plurality of characteristics, price, transaction history of the asset, location links to the virtual asset, etc.

The virtual asset designed by the user with the associated NFT is uploaded to a virtual marketplace, as illustrated in operation 123. The virtual marketplace may be available on a server, such as cloud gaming server that is accessible to users of a plurality of video games. In some implementations, the users are developers of video games. Uploading the virtual asset includes exhibiting the virtual asset in a virtual gallery defined in the virtual marketplace and activating the user interface for the virtual asset to receive feedback from the users. The feedback can include offers for purchase (i.e., bids), in addition to comments, likes, dislikes, ratings, offer to sell, offer to trade, etc.

Bids to purchase the virtual asset exhibited in the virtual gallery are received from developers of one or more video games, as illustrated in operation 124. In some implementations, the virtual asset may be offered for sale at the virtual gallery and the user interface may include options to allow users to offer bids to purchase the virtual asset. In some implementations, one or more developers may offer to purchase the virtual asset designed by the user so that they can include the virtual asset in a video game that they have designed or are designing. The developers may show interest in purchasing the virtual asset based on the marketplace dynamics at the virtual marketplace, wherein the marketplace dynamics can be gauged based on number and type of activities from a plurality of users at the virtual marketplace. In alternate implementations, the developers may offer to purchase the virtual asset based on their own interest.

The bids from the developers are evaluated and a bid from a specific developer for purchase of the virtual asset is identified, as illustrated in operation 125. Responsive to identification of the bid from the developer, the ownership of the virtual asset is transferred to the developer, as illustrated in operation 126. The transfer of the ownership of the virtual asset from the user who designed the virtual asset to the developer whose bid is approved includes sharing a location link of the virtual asset included in the metadata of the NFT with the developer. Further, the ownership of the virtual asset in the NFT maintained in the blockchain is updated to reflect change in ownership from the user to the developer. The location link provides the developer access to the virtual asset. The access to the virtual asset enables the developer to control use of the virtual asset including incorporating the virtual asset into a video game developed or being developed by them, to keep the virtual asset as a collectible, display the virtual asset in the marketplace, share the virtual asset with other users, and/or to trade the virtual asset.

Figure 2:
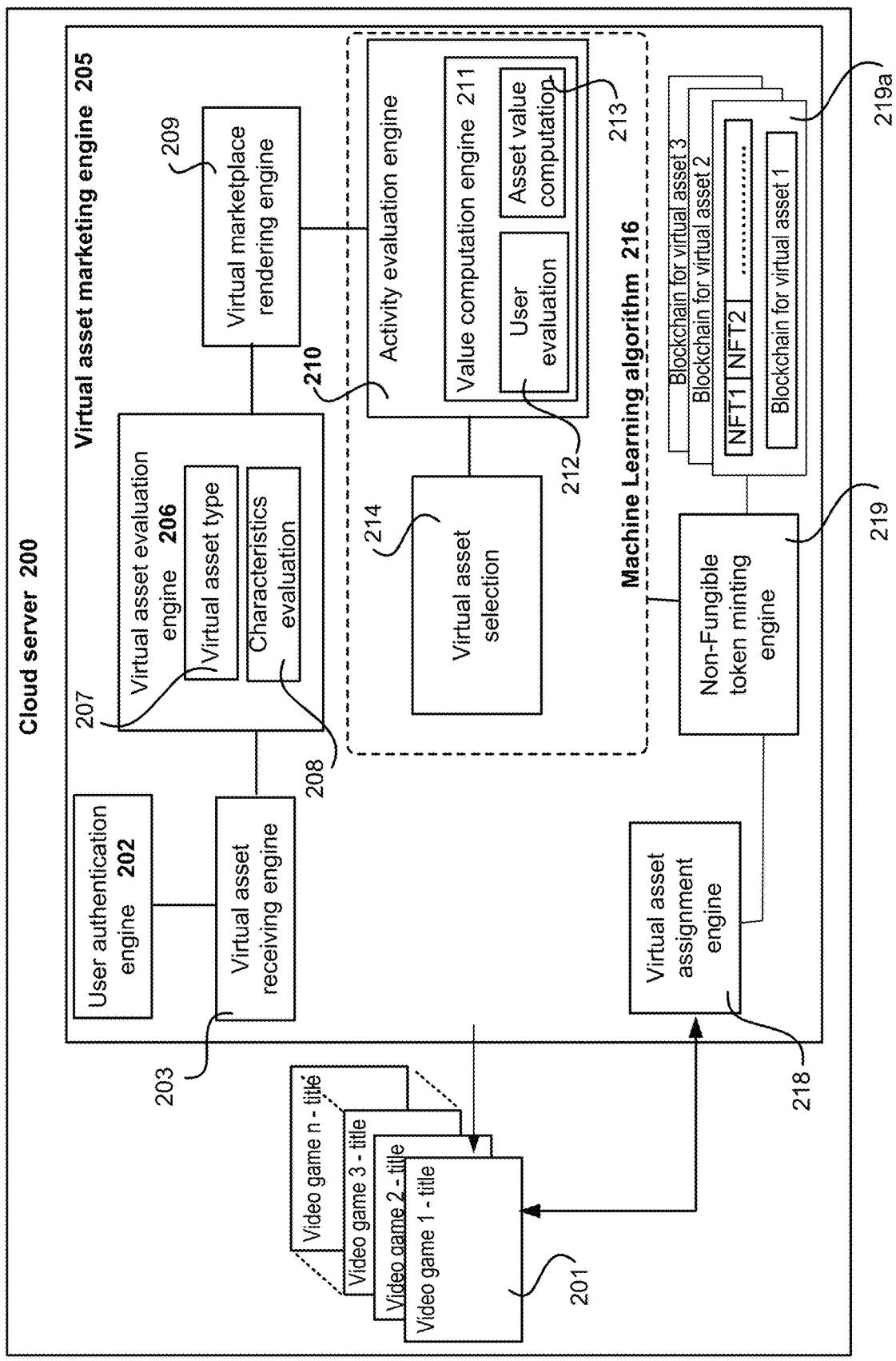
FIG. 2 illustrates a simplified block diagram of a virtual asset marketing engine used for presenting and marketing the virtual asset for use in a video game, in accordance with an implementation of the present disclosure.

FIG. 2 illustrates a simplified block diagram of a virtual asset marketing engine 205 that is used to market a virtual asset designed by a user for use in one or more video games 201, in one implementation. The virtual asset marketing engine 205 includes a plurality of sub-engines configured to perform specific functions including authenticating of the user(s) designing and providing virtual asset(s), verifying virtual asset(s) provided by user(s), evaluating the virtual asset(s) to ensure the virtual asset is designed to established standards (e.g., do not contain forbidden symbols/signs, do not behave in an unacceptable way, etc.), evaluating level of interest expressed by users to the virtual asset(s), minting non-fungible token(s) (NFTs) for the virtual asset(s), and providing access to the virtual asset to a specific user to allow the specific user to control use of the virtual asset including use in one or more video games 201. Some of the sub-engines of the virtual asset marketing engine 205 include user authentication engine 202, virtual asset receiving engine 203, virtual asset evaluation engine 206, virtual marketplace rendering engine 209, activity evaluation engine 210, virtual asset selection engine 214, virtual asset assignment engine 218, and non-fungible token minting engine 219, to name a few. The virtual asset marketing engine 205 is configured to execute on a server, such as a cloud server 200 that is part of cloud gaming system or a server that is part of a network of servers. The virtual asset marketing engine 205 is communicatively connected to a plurality of video games 201 hosted on one or more other servers of a cloud gaming system or network of servers to exchange data related to the virtual assets.

The user authentication engine 202 of the virtual asset marketing engine 205 is used to authenticate a user accessing the cloud server 200 for marketing a virtual asset either designed by them or designed by another user and acquired by them. The user may be a player or a spectator or a content provider who has designed the virtual asset for the purpose of including it in a video game. Alternately, the user may be a developer who has designed the virtual asset and wants to receive feedback to determine level of acceptability of the virtual asset by users of video games 201. The user authentication engine 202 accesses user profiles of authorized users maintained at the cloud server 200 to authenticate the user. The user profiles of authorized users identify users who are allowed to access and ware which virtual assets in their possession at the cloud server 200. Upon successful authentication of the user by the user authentication engine 202, information related to the user and the virtual asset designed or marketed by the user are forwarded to a virtual asset receiving engine 203 for virtual asset authentication.

The virtual asset receiving engine 203 receives the virtual asset designed or marketed by the user and examines the virtual asset to ensure that the virtual asset design conforms to the standards established for the one or more video games 201. The virtual asset receiving engine 203 examines the design to ensure that the design complies with the design standards and design requirements of one or more video games 201, and the virtual asset characteristics conform to the requirements of the different video games 201. The verified virtual asset design and characteristics are forwarded to the virtual asset evaluation engine 206.

The virtual asset evaluation engine 206 evaluates the virtual asset characteristics to determine whether the virtual asset that is being provided by the user is designed for inclusion in one or more video games 201, and identifying locations, game scenes, and ways for including the virtual asset in the one or more video game. As part of the evaluation, the virtual asset evaluation engine 206 evaluates a type of the virtual asset (207) to determine whether the virtual asset is designed as a game asset for use in one or more game scenes or a game character to represent a player in the video game. Further, the characteristics of the virtual asset (208) are evaluated to determine which ones of the characteristics are rendering characteristics, which ones are interaction characteristics, etc., of the virtual asset. The rendering and interaction characteristics are used to render and manipulate the virtual asset during play of the video game. For example, the look, design, color, shade/lighting, shape, size, moving vs. stationary, etc., are rendering characteristics that can be used for presenting the virtual asset in the game scenes of the video game, and the interaction characteristics defining the physics and kinetic aspects (i.e., how the virtual asset moves (distance, direction of movement, etc.), reacts to external stimulus, etc.), of the virtual asset can be used for defining how the virtual asset behaves/interacts in the video game. The details obtained from the evaluation of the various characteristics, including the identity, type, rendering and interaction characteristics of the virtual asset are used to define metadata of the virtual asset. Based on the evaluation of the virtual asset, the virtual asset evaluation engine 206 identifies the video games 201 available at the cloud server 200 for which the virtual asset is compatible.

The virtual marketplace rendering engine 209 is configured to use the type and characteristics of the virtual asset when uploading the virtual asset to a virtual marketplace accessible to a plurality of users of video games 201. In some implementations, the virtual marketplace is rendered alongside game titles of a plurality of video games 201 at the cloud server 200. In alternate implementations, the virtual marketplace is rendered at the cloud server 200 and accessible to the users of the video games 201. As noted, the users can be players, spectators, developers, content providers, content sponsors, etc. The virtual marketplace is designed to include a virtual gallery for exhibiting the virtual assets that are designed and/or presented by users and a user interface with options to comment and to facilitate trade, such as buy, sell, exchange, of the virtual asset. As noted, the virtual asset can be used as a game character or a game asset. The virtual gallery may include separate sections for exhibiting virtual assets that can be used as game characters and virtual assets that can be used as game assets, or all the virtual assets may be rendered in a single section.

Activities provided at the user interface for the virtual assets exhibited in the virtual gallery are collected, examined and processed by an activity evaluation engine 210. The activities can be provided at each virtual asset by the users and can be used to determine a level of interest expressed by the users. Accordingly, each activity is processed to identify a user providing the activity, type of activity provided, and other details of the activity. For example, the activity related to a virtual asset can be a buy, a sell, a trade/exchange or feedback. The feedback can be in the form of selection options (e.g., check boxes or radio buttons) to indicate a like, a dislike, a score on a rating scale, or can include a comment. When the activity includes feedback in the form of a comment, the comment is examined to identify keywords and the context of the keywords to determine the intent of the user providing the comment. The activities directed toward each virtual asset exhibited in the virtual gallery are used to compute a value for the virtual asset. A value computation engine 211 of the activity evaluation engine 210 is used to compute the value. The value computation engine 211 includes a user evaluation engine 212 and an asset value computation engine 213. The value for each virtual asset is computed by first evaluating the user generating the activity and then evaluating the activity itself. A user evaluation engine 212 is used to evaluate the user providing each activity. The user evaluation engine 212 uses the history of activities provided by the user to determine the reputation of the user in the video gaming community, for example. If the user is well-respected in the video gaming community, then any activity provided by that user is valued more than activity provided by other lesser-known users.

An asset value computation engine 213 is used to evaluate the activities of each user, which are directed toward virtual assets exhibited in the virtual marketplace. In one implementation, a machine learning (ML) algorithm 216 is used for evaluating the activities directed toward each virtual asset and computing value of each virtual asset. In some implementations, the ML algorithm 216 is used to generate and train an artificial intelligence (AI) model using the characteristics of the virtual assets as nodes and the inter-relationship of the attributes of the activities related to the different characteristics as edges between successive pair of nodes. The attributes of the activities capture the marketplace dynamics and provide an insight into which attributes are currently at play amongst the different users. The attributes that are preferred by some users may be different from the attributes that are preferred by some other users. For example, spectators may prefer the looks while the players may prefer the capabilities of the virtual asset or how hardy (e.g., capable of surviving when attacked) the virtual asset is, while the developers may prefer the popularity of the virtual asset amongst the users.

Each of the activities is analyzed to identify the type of activity, the user providing the activity, etc., and added to the overall number of such activities received for the virtual asset. Each activity can be weighted based on the activity type. Based on the analysis, the strengths of the edges of successive pair of nodes are adjusted up or down (i.e., strengthened or weakened in accordance to the activities received) and outputs indicative of relevance of the different characteristics for the different users are identified. For example, for a player, capabilities of the virtual asset may be important. As a result, the output pertaining to the activities related to the capabilities is selected to identify a virtual asset amongst the plurality of virtual assets available at the virtual marketplace with the best capabilities or most relevant capabilities for a video game. In another example, a developer may value the popularity of the virtual asset amongst the users. Consequently, the output related to the most activities garnered is selected to identify a virtual asset that is most popular amongst users. In another example, for the players, the design of the virtual asset may be important or relevant. In this example, the output pertaining to the activities related to the look of the virtual asset is selected to identify the virtual asset that is most innovative.

The activities provided by the users are feedbacks defining the marketplace dynamics for each virtual asset and the AI model is trained and the outputs refined dynamically to reflect the current marketplace dynamics for the virtual assets in the virtual marketplace. The AI model can be designed to be trained periodically or as and when a pre-defined number of activities are detected at the virtual marketplace.

Based on the evaluation of the activities received at the virtual marketplace, an asset value computation engine 213 is used to compute the value for each virtual asset in the virtual gallery using the outputs from the AI model, and, as noted, the outputs are selected from the AI model to correspond with the characteristics (e.g., looks, capabilities, hardiness, etc.) of the virtual assets that are relevant. The value for each virtual asset, in some implementations, is computed as a function of the type of activity, number of activities of each type, reputation of users providing each type of activity, characteristics addressed in the activity, etc., identified in the outputs of the AI model. The list of variables of the function for computing the value is provided as an example and that other variables may also be included in the value computation based on the variables identified or included in the outputs. The value computed for each virtual asset is forwarded to the virtual asset selection engine 214 for virtual asset selection.

The virtual asset selection engine 214 is used to compare the values of all the virtual assets in the virtual marketplace to identify a particular virtual asset designed by a specific user for inclusion in a video game. The particular virtual asset is identified to be the most relevant for the characteristics identified for a specific group of users. Access to the identified particular virtual asset with its unique characteristics is provided to enable inclusion of the particular virtual asset in a video game. A developer uses the type and characteristics of the particular virtual asset to update the code of the video game. As noted, the particular virtual asset can be a game character used for representing a player in the video game or can be a game asset for inclusion in game scenes of the video game.

When the particular virtual asset is a game character, the incorporation of the particular virtual asset in the video game includes adjusting code of the video game to present the particular virtual asset as a game character on a user interface used to render other game characters for players' selection. The characteristics can be broadly classified into rendering characteristics and interaction characteristics. The adjusted code ensures that the game character, when selected by a player, is rendered in accordance to the rendering characteristics (e.g., size, shape, color, appearance, moving or stationary, etc.) and behaves with other game characters and with game assets during play of the video game in accordance to the interaction characteristics defined for the virtual asset.

The particular virtual asset can be a game asset, such as a game object (e.g., weapon, tool, etc.) used by players to interact in the game scene, or can be a game asset that is provided as an obstacle or is a part of a game scene (e.g., an idol, a feature, etc.). When the particular virtual asset is a game asset, the incorporation of the game asset in the video game includes identifying one or more game scenes in which the game asset can be used/inserted and adjusting the code of the identified game scenes to include the game asset. As with the game character, the code of the video game is adjusted to present the game asset in accordance to the rendering characteristics and to behave in accordance to the interactive characteristics so that the players can view and interact with the game asset within the game scenes. When the virtual asset is a game object, incorporating the game asset includes assigning the game asset to a player to allow the player to use the game asset to interact in the game. The assigning of the game asset results in improving the game standing of the player. Further, the assigned game asset can be shared with other players within the video game or outside of the video game. In some implementations, the improvement in the game standing can include increase in any one or combination of asset value, a skill level, a game level, game winnings, and game assets.

In addition to evaluating the virtual assets and providing access to the virtual assets to the developers for inclusion in the video game, the virtual asset marketing engine 205 mints a non-fungible token (NFT) for the particular one or all of the virtual assets exhibited in the virtual gallery. The NFT minting engine 219 uses a publicly available or a proprietary blockchain to mint the NFT for particular one or all of the virtual assets. The minted NFT is stored in the blockchain and used to track use of the respective virtual asset designed by a user. In some implementations where NFT is minted for each virtual asset, the NFTs are minted as soon as a virtual asset is uploaded by a designer (i.e., user who created the virtual asset) to the virtual marketplace so as to be able to track use of the virtual asset within and outside of the video games available at the cloud server 200. In some implementations, the NFT of each virtual asset is stored in a distinct blockchain 219a and as and when a virtual asset is used, the corresponding NFT for the virtual asset is updated. For instance, every time a virtual asset is used in some transaction (e.g., buy, sell, trade, etc.) either outside the video game(s) or inside the video game(s), the NFT for the virtual asset is updated to keep track of such use. In alternate implementations, the NFT is minted for a particular virtual asset after the particular virtual asset is identified for inclusion in a video game by matching the characteristics that are relevant to the users (e.g., players, developers, spectators, etc.) of the video game to enable tracking use of the virtual asset within the video game.

When the virtual asset is incorporated into a video game as a game character, for example, and the game character is selected by a player from the user interface that includes game characters available for players' selection, the game character is assigned to the player. The assignment allows the player to control interactions of the game character in the video game via game inputs. Information related to the selection of the game character by the player to represent them in the video game and the assignment of the game character to the player is recorded in the NFT. The updated NFT for the virtual asset lists the player as the current owner. When the player loses or sells or trades the virtual asset to a second player in the video game, the NFT for the virtual asset is updated to record the second player as the current owner. Similarly, when a developer purchases the game character, the developer is provided access to the game character to allow the developer to include the game character in one or more video games developed by the developer.

In some implementations, after the virtual asset has been incorporated as game asset within the game scenes of the video game, the activities provided at the virtual asset is tracked. When an activity pertaining to the virtual asset is a buy or a sell or a trade of the virtual asset within the video game, the NFT is updated to reflect a change in ownership of the virtual asset to a new owner. A user can initiate an exchange of a first virtual asset for a second virtual asset. In this example, the NFTs of both the first and the second virtual assets are updated to reflect the details of the exchange and change in ownership. Further, the first virtual asset is removed from the game assets of the user and the second virtual asset is assigned to the user by incrementing the game asset to reflect the addition of the second virtual asset. In some implementations, when the activity from a user in the video game is to trade the virtual asset for an extra life or for exchanging for other game winnings or for improving game standing in the video game, the NFT of the virtual asset is updated to remove the user as the owner of the virtual asset and the virtual asset is de-assigned from the user.

In some implementations, a first user designs a virtual asset and places it in the virtual marketplace to get a feel for how the market reacts (i.e., marketplace dynamics) to the newly designed virtual asset. When a second user (e.g., a user outside of a video game, a game developer, a player or a spectator of a video game) expresses interest in the virtual asset, the virtual asset is transferred from the first user (i.e., creator of the virtual asset) to the second user and the NFT is updated to reflect the second user as the current owner. As part of transfer, a location link of the virtual asset is shared with the second user to allow the second user to have complete access to the virtual asset. The second user may elect to keep the virtual asset as a collectible, share the virtual asset with other users, or include the virtual asset in a video game. For example, the second user can be a developer of a video game and include the virtual asset in a portion of the video game. The second user can themselves test the virtual asset in the portion, and/or share the portion of the video game with other users to allow the other users to test the virtual asset and provide their feedback. Use of the virtual asset by the second user is recorded in the NFT to provide history of ownership and use.

In some implementations, the virtual asset is transferred to a first user for a period of time and upon expiration of the period, the virtual asset is returned to the virtual marketplace to allow other users to buy or otherwise have access to the virtual asset. This allows the first user as well as other users to have access to test the newly designed virtual asset while allowing the user who designed the virtual asset to determine a level of acceptability (i.e., demand) of their product in the marketplace. In some implementations, the virtual asset can be once again bought or otherwise accessed by the first user, if the virtual asset is available at the virtual marketplace and no other user has expressed interest in buying or otherwise accessing the virtual asset for a pre-defined period of time. In some implementations, the virtual marketplace for exhibiting the virtual asset is configured to be accessible only to users who design the virtual asset and to developers of one or more video games. In alternate implementations, the virtual marketplace is accessible to only the designers of the virtual asset and the players of a plurality of video games. In other implementations, the virtual marketplace is open to all users including users who have access to video games and users who do not have access to video games. In some implementations, in response to receiving activities from a plurality of users, the video games played by the plurality of users are identified and the access to the virtual asset is provided to each of the video games played by the plurality of users for inclusion in the respective video games. In these implementations, a distinct NFT is generated for the virtual asset in each of the video games to allow tracking of the use of the virtual asset in the respective video games.

FIG. 3 illustrates a sample virtual marketplace 300 that may be provided for exhibiting the virtual assets designed by the users, in one implementation. As previously noted, the virtual marketplace 300 includes a virtual gallery 301 to exhibit the plurality of virtual assets designed by users, and a user interface 302 rendered alongside the virtual gallery 301 to receive user interactions. The user interface identifies the type and some of the characteristics of the respective virtual asset and the user feedback received from a plurality of users. The plurality of users providing the feedback may be players, spectators, content providers, developers, etc., of one or more video games, or other users who are not associated with the video games. The user interface 302 also provides an option to provide an action for each virtual asset. The action shows the intent of the user, such as buy, sell, trade or collect the virtual asset. Depending on the intent expressed by a user, appropriate actions are taken, such as including the virtual asset in the video game, transferring the ownership of the virtual asset to a user, updating an NFT generated for the user to reflect the intent, etc.

The various implementations described herein provide ways to allow users to design virtual assets for inclusion in video games, thereby easing the burden on the developers. The virtual marketplace helps the users to easily market their wares (i.e., virtual assets) thereby increasing user engagement in the video game. NFTs are minted to easily track the use and ownership of the virtual assets while also providing ways to incentivize the user and providing more ways to keep the users engaged in the video games.

It should be noted that the cloud server 200 can communicate with other servers that are located remotely or are part of a cloud gaming site over a network, which can include local area network (LAN), wide area network, cellular network (e.g., 4G, 5G, etc.) or any other type of data network, including the Internet and such communication can be through wired or wireless connection. Embodiments of the present disclosure may be practiced with various computer system configurations including hand-held devices, microprocessor systems, microprocessor-based or programmable consumer electronics, minicomputers, mainframe computers, mobile devices, and the like. The virtual asset marketing engine 205 can be software executing on any one or more servers in the network. Embodiments of the present disclosure can also be practiced in distributed computing environments where tasks are performed by remote processing devices that are linked through a wire-based or wireless network.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for including a virtual asset within a video game, comprising:
receiving the virtual asset designed by a specific user for use in the video game, the virtual asset defined to include a plurality of characteristics;
presenting the virtual asset in a virtual marketplace accessible to users of the video game and receive feedback;
evaluating the feedback received from the users of the video game for the virtual asset at the virtual marketplace, the feedback from the users used to compute a value indicative of a level of acceptance of the virtual asset amongst the users of the video game, wherein the feedback is evaluated to determine preference of the users to each characteristic of the virtual asset and assigning a weight for said each characteristic in accordance to the preference and reputation of said users, and the value computed using said weight of said each characteristic, the weight and the value dynamically adjusted based on new feedback received from the users; and providing access to the virtual asset to allow incorporation of the virtual asset in the video game for use during play of the video game, based on the value of the virtual asset, wherein providing the access includes minting a non-fungible token (NFT) for the virtual asset and sharing location link of the virtual asset for incorporating, the NFT of the virtual asset stored in a blockchain and used to track the use of the virtual asset in the video game, and wherein operations of the method are performed by a machine learning algorithm incorporated within a virtual asset marketing engine executing on a game cloud server that is accessed by the video game.

2. The method of claim 1, wherein the blockchain for storing the NFT of the virtual asset is a proprietary blockchain.

3. The method of claim 1 wherein the blockchain for storing the NFT of the virtual asset is a public blockchain.

4. The method of claim 1, wherein the virtual marketplace includes a gallery space to display the virtual asset to the users and a user interface rendered alongside the gallery space, the user interface configured to facilitate buying, selling and trading of the virtual asset and to receive the feedback from the users, wherein the feedback includes comments and activities representing acceptability of the virtual asset, and wherein evaluating the feedback from the users includes evaluating the comments and the activities included in the feedback to compute the value for the virtual asset.

5. The method of claim 1, wherein the virtual marketplace is rendered alongside game title of the video game or alongside content of the video game presented at client devices of the users, wherein the video game is accessed from a cloud server for playing and viewing by the users.

6. The method of claim 1, wherein the users are players of the video game and the virtual asset is a game character for use to represent a player in the video game, wherein incorporating the virtual asset includes, presenting the game character alongside a plurality of game characters on a user interface presented within the video game for selection by the players of the video game; and responsive to receiving selection of the game character by the player, including the game character in the video game for manipulation using inputs provided by the player, the game character exhibiting the one or more characteristics in response to the inputs received from the player during play of the video game.

7. The method of claim 1, wherein the users are players of the video game, wherein the virtual asset is incorporated as a game asset in one or more game scenes of the video game to allow the players of the video game to interact with the game asset, the game asset exhibiting the one or more characteristics defined by the specific user in response to interactions from the players, during play of the video game.

8. The method of claim 7, wherein the one or more characteristics of the game asset defined to improve a game standing of a player, in response to the player interacting with the game asset.

9. The method of claim 8, wherein improving the game standing of the player includes increasing any one or combination of an asset value, a skill level, a game level, game winnings, and game assets of the player in the video game.

10. The method of claim 1, wherein incorporating the virtual asset includes associating the virtual asset as a game asset to a first user, in response to the first user buying the virtual asset in the virtual marketplace, the buying of the virtual asset incrementing game assets of the first user in the video game, wherein the first user is a player of the video game.

11. The method of claim 1, wherein the virtual marketplace is used to exhibit virtual assets designed by select ones of the users including the specific user, wherein evaluating the feedback received from the users includes identifying the virtual asset designed by the specific user for incorporating in the video game, based on the value computed for each of the virtual assets exhibited in the virtual marketplace, and wherein the value of each virtual asset exhibited in the virtual marketplace is computed periodically using comments received from the users.

12. The method of claim 11, wherein the virtual asset designed by the specific user is incorporated into a plurality of video games including the video game.

* * * * *